J. B. Gathright.
Side Saddle.

No. 3,988. Reissued May 24, 1870.

Witnesses

J. D. Harrington

A. L. Fitzsimons

Inventor

Jos. B. Gathright

United States Patent Office.

JOSEPH B. GATHRIGHT, OF LOUISVILLE, KENTUCKY.

*Letters Patent No.* 74,909, *dated February* 25, 1868; *reissue No.* 3,988, *dated May* 24, 1870.

IMPROVED TREE FOR SIDE-SADDLES.

The Schedule referred to in these Letters Patent and making part of the same

*To all whom it may concern:*

Be it known that I, JOSEPH B. GATHRIGHT, of Louisville, in the county of Jefferson and State of Kentucky, have invented a new and useful Improvement in Trees for Side-Saddles; and I do hereby declare that the following is a full, clear, and exact description thereof, reference being had to the annexed drawings making part of this specification, in which—

The same letters indicate identical parts in the several figures.

A A′ are the bars.

B B the cantle.

D D′ the prolongation of cantle on "off" side, and

E the leather base for "off" horn and "back-spring."

These, with the letters indicating other minor points or parts, will be explained in the following description of the construction of the tree.

The bars A A′ are constructed substantially as the bars of the Texas trees for men's saddles, being shaped underneath to suit the back of the horse without a pad, and projecting beyond the horns in front and the cantle in the rear, but made of thicker material to allow a deeper "dish" in their upper surfaces at *c c′*, thereby giving a broad flat seat.

The cantle B B is thrown back very "flat" upon the "bars," and is extended laterally beyond them with concave upper surface, harmonizing with curves *c c′* of the "bars" and forming a portion of the seat.

The point *d*, by this flatness or declined position of the cantle and its dished upper surface, is thrown well forward, partially surrounding the seat, and thereby avoiding the necessity for the "belly" in making the saddle. At the opposite side the point of the cantle is, by jointing at any part, as at *e*, made to extend, by the prolongation D D′, to the front of the tree.

The prolongation D D′ has a base and outer rims, substantially like those of the cantle, and curves in its upper surface in such a manner as to harmonize with the seat-dish *c′*, and form a continuance of the same. It gradually diminishes in width, and by curve approximates the upper edge of A′, which it meets at the termination of the seat-curve, and continues with it to the end, forming, by its horizontal surface as seen at D′, the base for the support of the "off" horn. This construction of D D′ also avoids the necessity for the "belly" on "off" bar and the "filling" for the back-spring.

Figure 1:
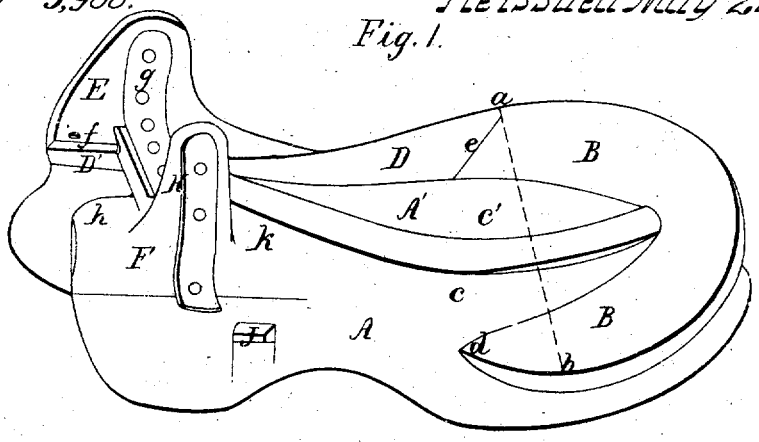
Figure 1 is a perspective view.
Figure 3:
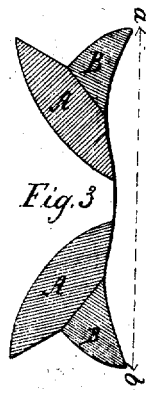
Figures 3 and 4 are transverse sectional views.
Figure 2:
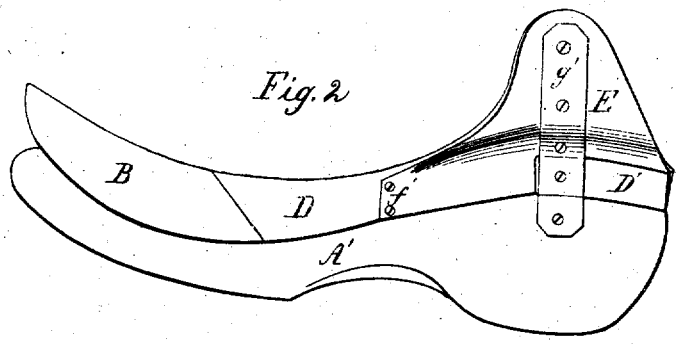
Figure 2 is an elevation.
Figure 4:
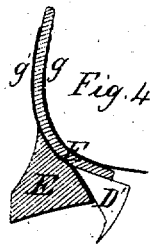

E′ is one or more thicknesses of leather or other similar material, cut in desired shape for horn and back-spring, and is secured to D D′ at *f*, as seen in fig. 1, and at *f′*, as seen in fig. 2. It is supported in position and shape for the horn by being riveted between an iron bar, *g*, as seen in fig. 1, and *g′*, as seen in fig. 2. (See also edge view of E, and supports *g* and *g′* in fig. 4.)

The addition of block F to bar A gives a basis for the "spring," as seen at *h*, and requisite breadth for seat at *k*, and at the same time furnishes a base and support for the "near" horn H.

I shows a hole through the bar for the stirrup.

I do not claim the particular construction described, but the shape and the style of the tree, which is novel.

The construction described is only one of very many which would accomplish substantially the same effect.

What I claim as my invention, and desire to secure by Letters Patent, is—

1. The flattened concave cantle B B with projecting points, forming in conjunction with curves *c c′*, of A A′, a semicircular cavity for seat, substantially as set forth.

2. The semicircular cavity for seat, as herein described, in combination with the Texas style of bars A A′, substantially as set forth.

3. The part E, being leather, or other material operating substantially the same, cut in desired shape, and riveted to iron bars *g* and *g′*, forming at the same time a complete horn, and, in conjunction with D D′, a complete back-spring, substantially as set forth.

4. As an article of manufacture, the saddle-tree, combining in its construction the semicircular cavity for seat, the Texas bars A A′, and the part E, substantially as set forth.

In testimony whereof I have signed my name to this specification before two subscribing witnesses.

J. B. GATHRIGHT.

Witnesses:

B. EDW. J. EILS,

R. MASON.